United States Patent
Geng

[11] Patent Number: 6,128,995
[45] Date of Patent: Oct. 10, 2000

[54] CUTTING DEVICE FOR AGRICULTURAL MACHINES

[75] Inventor: Manfred Geng, Saulgau-Bogenweiler, Germany

[73] Assignee: Claas Saulgau GmbH, Saulgau, Germany

[21] Appl. No.: 09/030,468

[22] Filed: Feb. 25, 1998

[30] Foreign Application Priority Data

Feb. 26, 1997 [DE] Germany .......................... 197 07 662

[51] Int. Cl.$^7$ ...................................... B26D 5/08
[52] U.S. Cl. .................... 83/601; 83/564; 83/928; 56/341
[58] Field of Search ............... 83/601, 563, 564, 83/928; 56/341

[56] References Cited

U.S. PATENT DOCUMENTS

| | | | |
|---|---|---|---|
| 4,802,395 | 2/1989 | Merritt, III et al. | 83/649 |
| 5,205,105 | 4/1993 | Krone et al. | 83/928 X |
| 5,450,704 | 9/1995 | Clostermeyer | 53/118 |
| 5,826,418 | 10/1998 | Clostermeyer | 53/341 |

FOREIGN PATENT DOCUMENTS 43 02 199 C2  7/1994  Germany .

*Primary Examiner*—M. Rachuba
*Attorney, Agent, or Firm*—Michael J. Striker

[57] ABSTRACT

An agricultural machine has a feed passage for stalk products, a cutting device provided on the feed passage and having a plurality of turnably supported knives which are arranged in a row and extend in their cutting position into the feed passage, spring loaded knife levers which hold the knives in the cutting position, so that under the action of a foreign body the knives can turn out against a spring loading from the feed passage, a joint traverse with which the knife levers are displaceably connected through hingedly connected rods, a frame which is downwardly turnable to a fixed abutment and in which the cutting device is arranged, the frame having side walls provided with slot guides, the traverse being displaceably received at both ends of the traverse in the slot guides of the side walls of the frame, and a cylinder-piston a unit which engages with the traverse.

9 Claims, 5 Drawing Sheets

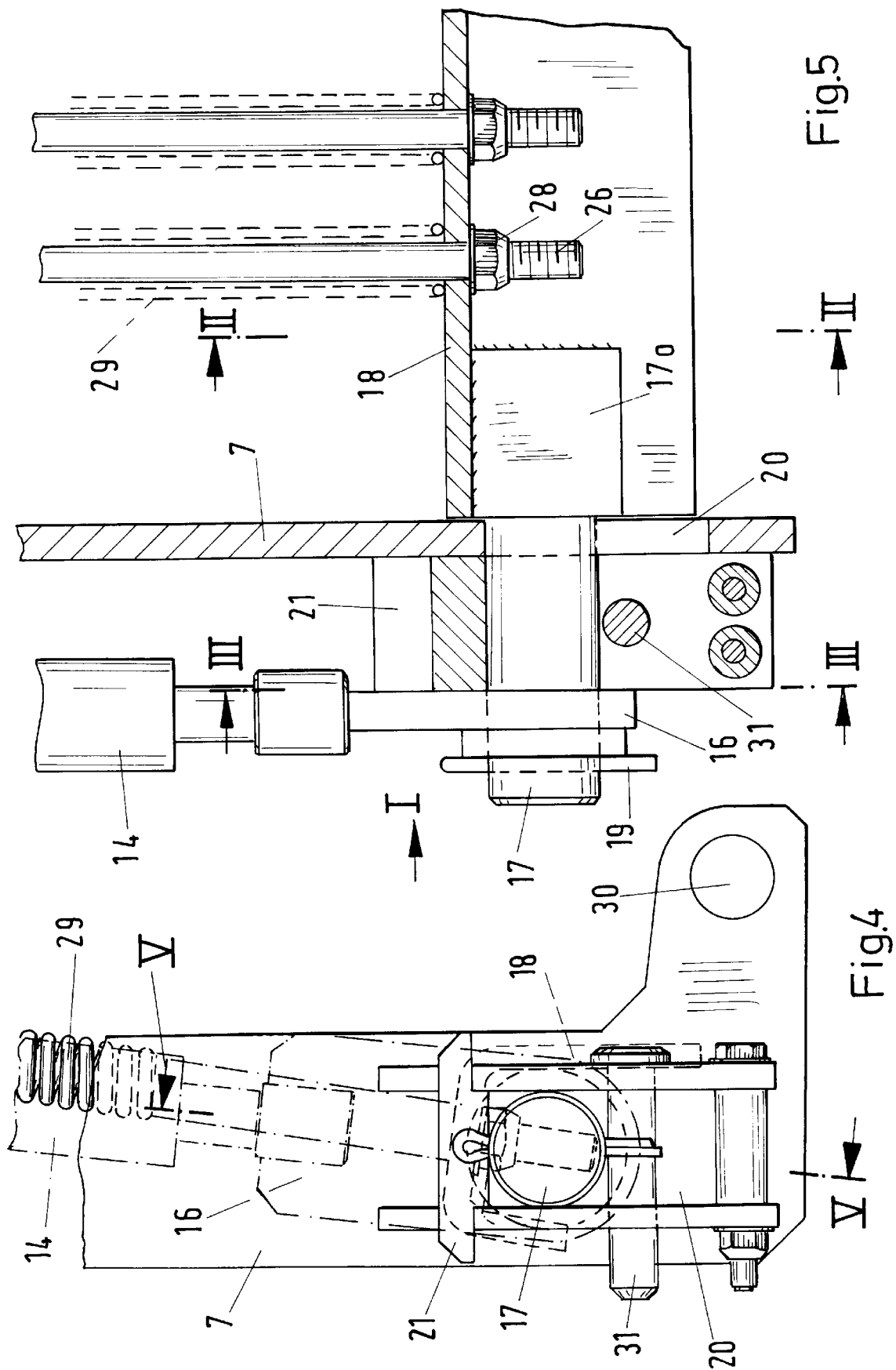

CUTTING DEVICE FOR AGRICULTURAL MACHINES

BACKGROUND OF THE INVENTION

The present invention relates to a cutting device for agricultural machines, which is located on a feed passage for stalk products. Such cutting device are provided in particular on drivable bailers and self-loading forage wagons, in which the stalk product is taken by a pickup from the ground and must be subsequently comminuted.

A cutting device of this type is disclosed for example in the German patent document DE 43 02 199. The specific feature of this cutting device is that the knife lever which abuts against the knives under the action of individual associated spring elements can be jointly turned out for dismounting of the knives without tensioning of the spring elements, or in other words with a relatively low force. For this purpose the knife lever is connected through rods with an immovable joint transverse element. The rods which are surrounded in this case each by a pressure spring, extend through the traverse and are provided with abutments at their ends. Thereby, a knife under the action of a foreign body, for example when a stone is located in the feed passage, can turn out from the feed passage with compression of the associated spring element for a short time. The individual rods are freely movable. If on the other hand, the traverse is moved by means of cylinder-piston units engaging with it, then the rods are taken along because of their abutments and lift the knife lever from the knives, so that the spring length does not substantially change. The above-described cutting device can be further improved.

SUMMARY OF THE INVENTION

Accordingly, it is an object of present invention to provide a cutting device for agricultural machines of the above mentioned general type which is simplified and facilitates dismounting of the knives, with the provision that the cutting device can be turnably brought downwardly as a whole for inspection and knife exchange, and cylinder-piston units are provided for executing this turning movement.

In keeping with these objects and with others which will become apparent hereinafter, one feature of present invention resides, briefly stated, in a cutting device for agricultural machines of the above mentioned general type, in which the cutting device is arranged in a frame which is downwardly turnable to a fixed abutment, with cylinder-piston units provided for its actuation, the traverse is displaceably received at both ends in slot guides of side walls of the frame, and the cylinder-piston units engage with the traverse.

When the cutting device is designed in accordance with the present invention, then for turning the cutting device the cylinder-piston units which are available anyway are extended for opening of the knife lever, so that the knives can be dismounted In this process the turning downwardly of the cutting device and the turning out of the knife lever follow one another.

In the above mentioned known cutting device the traverses are movably supported by means of a lever arrangement, and the forces of the cylinder-piston units are applied by multiple lever deviation for the application. In accordance with the present invention, the traverses are displaceably received in the side walls of the cutting device frame in slot guides, and the cylinder-piston units directly engage the traverses. Therefore, a substantial simplification is obtained.

In accordance with a preferable embodiment of the invention, the cylinder-piston units are formed as double-acting units. Therefore, it is possible first to turn the cutting device from the operating position to an abutment downwardly, and then with a remaining portion of the stroke length to move the traverse in the slot guides and to thereby turn out the knife lever. During a counter movement first the traverse is moved, so that the knife levers are turned back by their weakly tensioned springs to the operational position, and during the longer remaining stroke path the cutting device is turned upwardly.

Alternatively, for turning out the cutting lever separate cylinder-piston units or in particular strong spring elements can be provided, which engage the traverse and move the same in the slot guides with taking along the rods engaging the knife levers to the position in which the knife levers are turned out. In this case, the cylinder-piston unit for the turning movement of the cutting device can be a single-acting unit. In both cases it is important that the cutting device in the turned-out lower position is caught by the abutments. In an especially advantageous embodiment the abutment arrangement is provided with hinge shackles which are connected each hingedly or by a slot guide and a hinge with one another and in their extended position form the abutment.

It is further advantageous when the cutting device is retained in a turnable frame which also contains a part of a bottom of the feed passage through which the knives extends. Then knives in accordance with this construction, during turning of the cutting device are not pulled out through the bottom of the feed passage from the feed passage, but instead the bottom portion during turning of the cutting device follows. For dismounting the knives are pulled out upwardly through the slots in the feed passage bottom.

In the above mentioned known cutting device it is known to support the knives for their deviating movement under the action of foreign bodies turnably about pins located on an eccentric shaft. The knives have angular slots and the pins hold the knives in their mounted position turnably, but locked. For dismounting, the eccentric shaft is turned by 180°, so that the knives are released from the pins. In order to facilitate in this arrangement the pulling up of the knives through the slot of the feed passage bottom, a joint turnable lifting device is provided which is parallel to the eccentric shaft and formed to lift the unlocked knives by abutting against their lower edges.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a side view of a cutting guide of a traverse of the inventive cutting device on an enlarged scale;

FIG. 5 is a view showing a section taken along the line V—V through the slot guide of FIG. 4.

DESCRIPTION OF PREFERRED EMBODIMENTS

Figure 1:
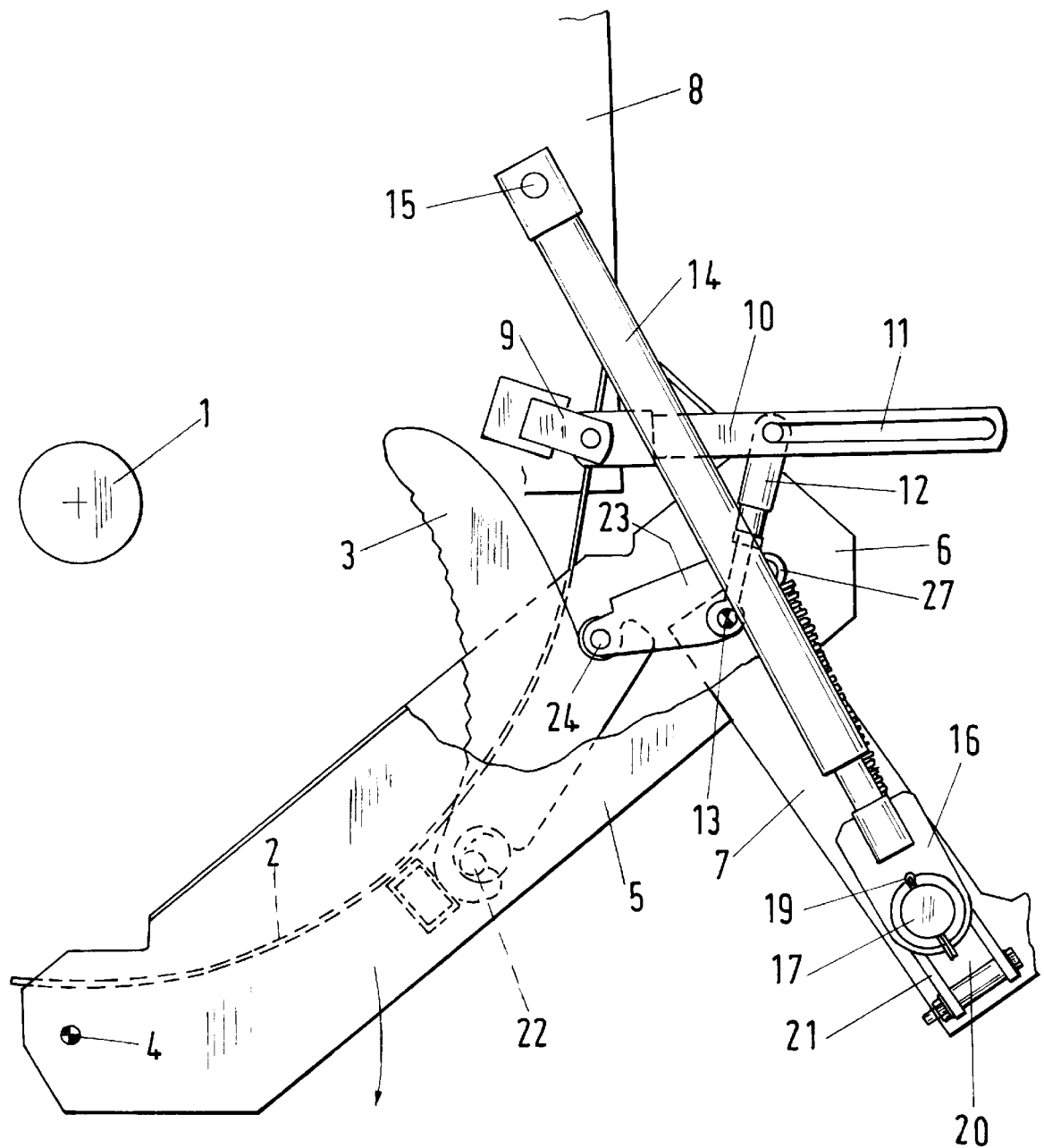
FIG. 1 is a side view of a cutting device in accordance with present invention in an operative position.
Figure 2:
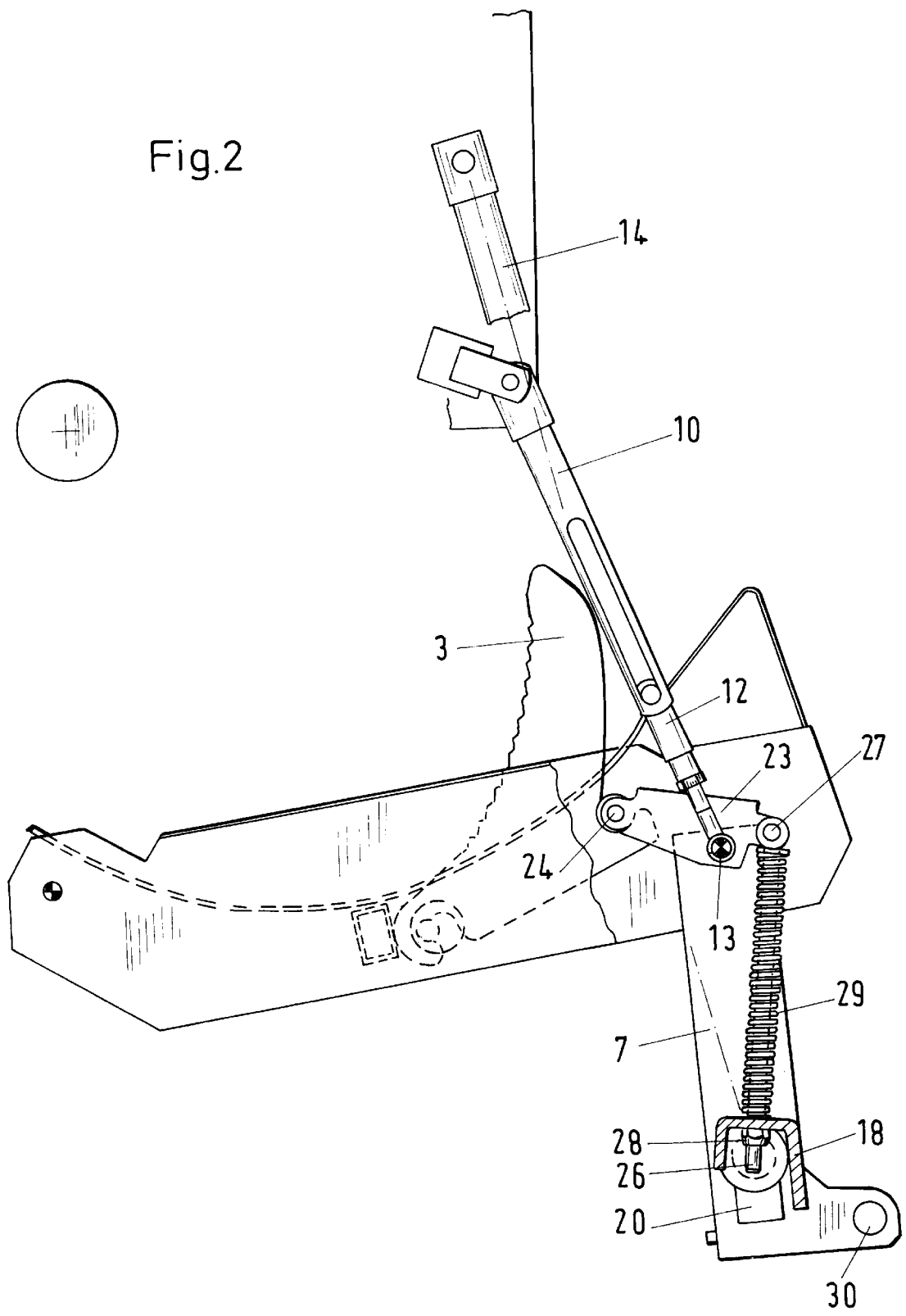
FIG. 2 is a view showing a cutting device in a downwardly turned open position with knife levers which are not acted upon.
Figure 3:
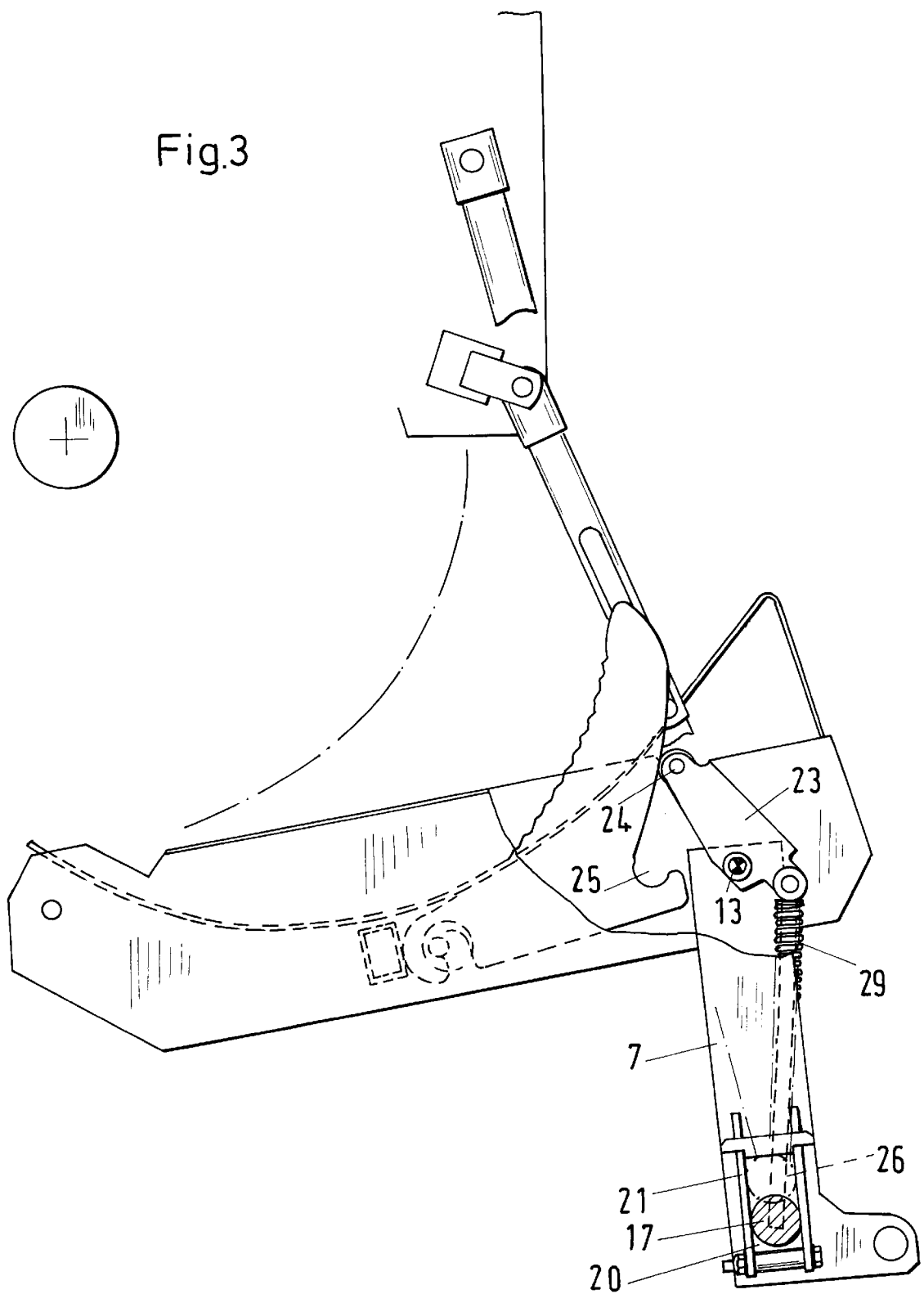
FIG. 3 is a view showing the cutting device in the position of FIG. 2, but with the turned out knife levers.

In order to more clearly understand the details of a slot guide and traverse of a cutting device of the present invention, FIGS. 1–3 provide illustrations in accordance with a view 1, a section II—II and a section III—III of FIG. 5.

A cutting device has a feed rotor rotatable about a rotor shaft 1 and provided with prongs which extend near a bottom 2 of a feed passage. They run between knives 3 which extend into the feed passage and cooperate with the knives. The cutting device is mounted in a frame which is supported downwardly turnably about horizontal rotary pins 4 and has two side walls 5 and 6. The barrel-shaped curved feed passage bottom 2 is mounted in the region of the cutting device on the frame and turns together with it. For passage of the knives 3, slots are provided in the feed passage bottom, they are dimensioned correspondingly, and extend in a peripheral direction. Perpendicularly projecting L-shaped projections 7 are mounted on both side walls 5 and 6.

The housing 8 of the corresponding agricultural machine, for example a self-loading forage wagon is provided at both sides with two-part hinge braces which act as abutments and intercept the cutting device in its lower position. Each of the hinge braces is composed of a lug 9 mounted on the machine housing 8, a first hinge bracket 10 with a longitudinal slot 11, and a second longitudinally displaceable hinge bracket 12. One end of the last bracket engages with a rotary pin in the slot 11. The other end is rotatably supported on a pin 13 which is fixedly arranged on the side wall 5. Furthermore, cylinder-piston units 14 are mounted at both sides of the housing 8 hingedly about rotary pins 15. Lugs 16 are mounted on the ends of the piston rods on the cylinder-piston units. The lugs 16 are fitted on extension pins 17 of a traverse 18 and secured by cotter pins 19.

The traverse 18 has a U-shaped cross-section with unequal legs. The extension pins 17 are inserted at the ends in the U-shape and welded as shown in FIG. 5. For this purpose the extension pins have a portion 17 which is connected flush with the traverse and has a greater diameter which is partially flattened. The projecting full cylindrical portion has a smaller diameter.

The projections 7 which are formed as flat iron parts have each rectangular window recess 20, and it is flanged on the outer side of the projection by a frame 21 fixedly connected with the projection. The extension pins 17 can be displaced between an upper and a lower end position in the elongated window recess 20.

The knives 3 are turnable relative to their associated locking and rotary pins 22. They are held by two-arm knife levers 23 in their basic position relative to the frame, which with the upwardly turned cutting device corresponds to the operational position as shown in FIGS. 1 and 2. The knife levers 23 turn around rotary pins 13 which are mounted on the side walls. They have on a lever arm a roller 24 which is located in a corresponding depression 25 of the knife as shown in FIG. 3. A rod 26 is hingedly connected to another lever arm by a hinge 27. The hinge extends through the traverse 18 as shown in FIG. 2 and carries at the end a self-locking nut 28 shown in FIG. 5 and operating as an abutment. The rod is surrounded by a pressure, spring 29 which is supported on the one hand on the traverse 18 and on the other hand on the hinge 27.

The above described arrangement operates as follows.

In the operating position shown in FIG. 1, not only the cutting device as a whole can be secured by pins which are inserted for example in pin openings 30 of the projection 7, but, also the extension pins 17 are secured in their upper position by safety pins 31 extending traversely through the frame 21 as shown in FIG. 4 and 5. Since the traverse 18 can not yield, the pressure springs 29 press on the knife levers 23 and hold the knives in their cuffing position. In the event of overloading by a foreign body or the like, the knives can yield to the right by turning. Thereby, the pressure spring is overcome and the rollers 24 run on the knife backs. This overloading securing brings the knives subsequently again to their original position.

For inspection of the cutting device, it is turned out. For this purpose the pins are removed from the openings 30, the safety pins 31 are pulled, and the cylinder-piston units 14 are extended. The cutting device reaches the position of FIG. 2 in which the hinge brackets 10 and 12 are located in their extended abutment position. The cylinder-piston units 14 move however farther and press the traverse 18 to its lower position. It pulls through the rods 26 the knife levers 23 and turns them to the right to the position shown in FIG. 3. Thereby the knives are unloaded from the pressure of the rollers 24 and can be dismounted. This is described later in detail.

When the inspection ends, the cylinder-piston units 14 are again retracted. During the first portion of the stroke path the traverse is moved again to the upper position and the knife levers return to their operational basic position. Therefore, the whole cutting device is again returned to the position shown in FIG. 1 and locked in this position.

It should be mentioned that the cutting device can be lowered under the action of its gravity force, and in this case a single-acting cylinder-piston unit can be utilized whose force is used for upward turning. In this case, in particular at the ends of the traverse, strong pressure springs can be provided, which displace the traverse 18 to its lower position. During downward turning of the cutting device, the knife levers 23 are turned outwardly. The inward turning is performed when the cutting device reaches its upper end position and the lifting cylinder-piston units in a last portion of their path pull the traverse 18 upwardly and therefore with tension the strong pressure springs.

Figure 6:
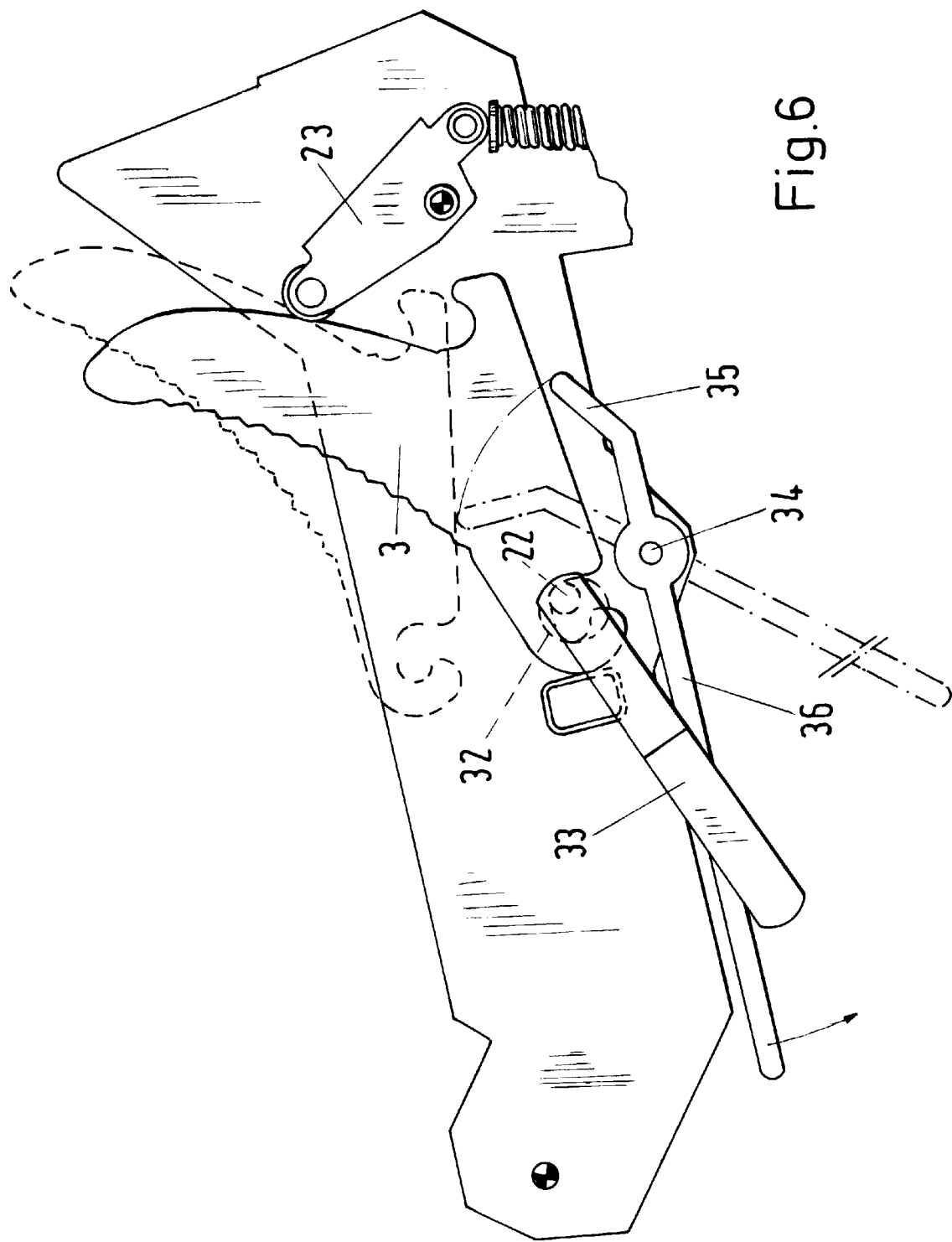
FIG. 6 is a further side view of the cutting device with different phases of a knife dismounting and an additional lifting element.

FIG. 6 shows again in a simplified illustration a side wall of the cutting device frame and the knife levers 23 in a turned out position. The knife 13 shown in solid lines is already unlocked because of turning of the eccentric shaft 32 around 180°. For this purpose, a gripping lever 33 is arranged on the eccentric shaft and not shown in other drawings. The locking and rotary pin 22 is inserted into the outwardly open part of the angled knife slot, so that the knife 3 can be withdrawn now upwardly.

Occasionally, there are difficulties when the knives are dirtied and adhere in the feed bottom slots. For further facilitation of dismounting of the knives, a lifting arrangement is provided. It is supported rotatably about pins 34 on the side walls which for this purpose are somewhat expanded downwardly.

The lifting device includes a profiled iron piece 35 having a V-shaped cross-section. It extends parallel to the eccentric shaft 32 and abuts with its edge traversely on the lower edge of the knife 3. The profiled iron piece 35 can be turned by a gripping lever 36 to a position identified with dash-dot lines. Thereby, the cutters 3 are displaced further upwardly to a position shown in broken lines, so that they can be easily removed.

It will be understood that each of the elements described above, or two or more together, may also find a useful application in other types of constructions differing from the types described above.

While the invention has been illustrated and described as embodied in cutting device for agricultural machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. An agricultural machine, comprising a feed passage for stalk products; a cutting device provided on said feed passage and having a plurality of turnably supported knives which are arranged in a row and extend in their cutting position into said feed passage; spring loaded knife levers which hold said knives in the cutting position, so that under the action of a foreign body said knives can turn against a spring loading from said feed passage; a joint transverse with which said knife levers are displaceably connected through hingedly connected rods; a frame which is downwardly turnable to a fixed abutment and in which said cutting device is arranged, said frame having side walls provided with slot guides, said traverse being displaceably received at both ends of said traverse in said slot guides of said side walls of said frame so that during a displacement of said traverse with said ends in said slot guides said knife levers of said cutting device are turned from an operative position to an inoperative position and vice versa; and a cylinder-piston unit engaging said traverse.

2. An agricultural machine as defined in claim 1, wherein said spring elements are formed as spring elements which act strongly on said traverse and with taking along said rods acting on said knife levers, bring said traverse in said slot guides to its end position, said cylinder-piston unit being a single-acting cylinder-piston unit and during turning of said frame tensioning said strong spring elements.

3. An agricultural machine as defined in claim 1, wherein said cylinder-piston means is arranged so as to turn out said knife levers.

4. An agricultural machine as defined in claim 1; and further comprising two brackets which are hingedly connected with one another and in their extended position form said abutment for said frame when said frame is turned downwardly.

5. An agricultural machine as defined in claim 1; and further comprising two brackets which are connected with one another by a slot guide and a hinge and form in their extended position said abutment for said frame when it is turned downwardly.

6. An agricultural machine as defined in claim 1, wherein said frame forms a part of a bottom of said feed passage, so that said knives extend through said part.

7. An agricultural machine as defined in claim 1; and further comprising a rotatable eccentric shaft; and locking and rotary pins arranged on said eccentric shaft and lockingly holding said knives in a mounting position in which said knives are turned upwardly, so that by rotating said eccentric shaft, said knives can be unlocked for dismounting.

8. An agricultural machine as defined in claim 7; and further comprising a turnable joint lifting element which extends parallel to said eccentric shaft and lifts said knives when they are unlocked by abutting against lower edges of said knives.

9. An agricultural machine, comprising a feed passage for stalk products; a cutting device provided on said feed passage and having a plurality of turnably supported knives which are arranged in a row and extend in their cutting position into said feed passage; spring loaded knife levers which hold said knives in the cutting position, so that under the action of a foreign body said knives can turn against a spring loading from said feed passage; a joint transverse with which said knife levers are displaceably connected through hingedly connected rods; a frame which is downwardly turnable to a fixed abutment and in which said cutting device is arranged, said frame having side walls provided with slot guides, said traverse being displaceably received at both ends of said traverse in said slot guides of said side walls of said frame to that during a displacement of said traverse with said ends in said slot guides said knife levers of said cutting device are turned from an operative position to an inoperative position and vice versa; and a cylinder-piston unit engaging said traverse, said cylinder-piston unit being formed so that starting from an operational position it turns downwardly said frame to said abutment and during remaining stroke moves said traverse in said slot guides and thereby turns said knife levers through said rods; and spring elements arranged so that during an opposite movement said knife levers are turned by said traverse and said spring elements and subsequently said frame is turned upwardly.

\* \* \* \* \*